June 5, 1962     C. M. ROSSER     3,037,868
SHRINKABLE MOISTUREPROOF FOOD WRAPPING MATERIAL Filed Sept. 24, 1959     2 Sheets-Sheet 1

June 5, 1962  C. M. ROSSER  3,037,868
SHRINKABLE MOISTUREPROOF FOOD WRAPPING MATERIAL
Filed Sept. 24, 1959  2 Sheets-Sheet 2

3,037,868
SHRINKABLE MOISTUREPROOF FOOD WRAPPING MATERIAL

Charles M. Rosser, Wallingford, Pa., assignor to American Viscose Corporation, Philadelphia, Pa., a corporation of Delaware
Filed Sept. 24, 1959, Ser. No. 842,161
13 Claims. (Cl. 99—171)

This invention relates to the production of composite moistureproof flexible sheet materials from thin hydrophilic films, and particularly to the production of novel shrinkable moistureproof casings adapted for the packaging of meat or other food products. This application is a continuation-in-part of application Serial No. 518,785, filed June 29, 1955, now abandoned.

In the packaging of meats, regenerated cellulose casings or wrappers are preferred because of their low cost, high transparency, and imperviousness to grease and other organic components of the meat. An important feature of the cellophane or other regenerated cellulose casing in the packing of meats is that it may be wetted prior to stuffing to render it stretchable and then, as it dries out after being stuffed, it shrinks tightly around the contents. It thus eliminates air spaces and forms a tight package free of air which might degenerate the contents, and it adheres tightly to the contents so as to reveal with high transparency the appearance thereof. On account of the high water vapor transmissibility of regenerated cellulose film, packages comprising casings thereof and food which contains water tend to lose weight. This is undesirable, for example, in the sale of prepackaged meats since the vendor must sell on the basis of the weight as delivered to the purchaser.

In general, casings which are coated with a moistureproofing composition before stuffing have not been acceptable because they swell in water too slowly before stuffing and do not shrink satisfactorily around the contents. Moreover, the moisture-proof coating normally consists of material less resistant to abrasion than regenerated cellulose film and thus loses its glossy appearance more rapidly, and as the coating becomes scuffed, the casing becomes less moisture-resistant.

The practice of applying a moisture-proof coating after the stuffing operation has the advantage of permitting further processing of the meat or other food while incased before the casing is moistureproofed. The principal disadvantage of aftercoating is that it isubstantially increases the cost of packaging the food over that entailed in using precoated or uncoated film. To use a regenerated cellulose film as a casing having a moistureproof coating on the inside is not desirable because in general greases or other organic constituents of foods, e.g., meat, infiltrate the moistureproof coating and bring about changes which lower its resistance to the passage of vapor through casing walls.

It is a principal object of this invention to provide a composite moistureproof flexibe sheet or wrapping material having outer surfaces constituted of a water-insoluble hydrophilic sheet material, such as regenerated cellulose. It is another object to provide a heavy film-like material resistant to the passage of moisture therethrough having good swelling and stretching characteristics adapting it for fabrication into casings used in the manufacturing of stuffed meat or food products. It is also an object to produce a wrapping material or casing formed therefrom having good transparency, grease resistance, toughness at low as well as high humidities, and high external gloss. Still another object is to provide a wrapping material of laminated construction, or casings formed therefrom, bearing printed material which is covered by a lamina to protect the printing from surface conditions as well as from the contents covered by the wrapper or casing, whereby the brightness, gloss and definition of the printing is maintained, and contamination or discoloration of the contents by printing ink is prevented. A further object is to provide a moisture-proof hydrophilic cellulosic wrapping material requiring no moistureproof coating. Other objects, features, and advantages of the invention will be apparent from the examples appearing hereinbelow and the drawing in which:

FIG. 1 is a diagrammatic longitudinal elevation of one apparatus for preparing the multi-ply sheet of this invention;

FIG. 1-A is a diagrammatic longitudinal elevation of another apparatus for preparing the multi-ply sheet of this invention;

Figure 1:
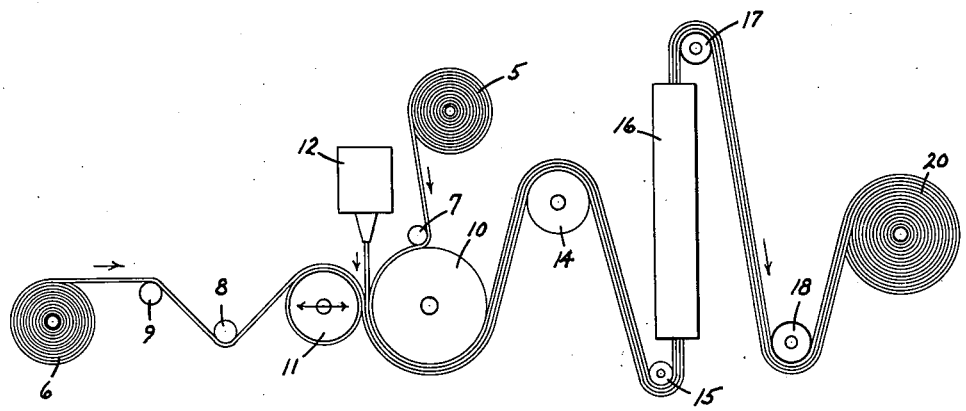

The invention, in brief, concerns the production of a laminated film or sheet comprising a minimum of three plies of which the outer facial plies comprise a flexible, water-insoluble hydrophilic film susceptible to stretching when wet and shrinking when dried, an intermediate ply comprising a hydrophobic film of vinyl resin susceptible of plastic deformation, and an anchoring agent firmly anchoring the plies to one another. In a specific preferred form of the invention, the laminated sheet or film just described is shaped into a casing formed from a sheet of the film with a pair of opposite edges overlapped and sealed to one another. Because the present invention is concerned with the production of moistureproof casings which have unique stretching and shrinking characteristics adapting the casings for wetting before stuffing, the structure of the casings is preferably limited to three plies of alternately disposed hydrophilic and hydrophobic materials so that effective wetting and drying of the hydrophilic plies may be carried out.

The multiple-ply composite sheet of this invention may be assembled by utilizing one of several procedures. For example, it may be fabricated by feeding an unoriented hydrophobic vinyl film so that it falls between two advancing films of a water-insoluble hydrophilic cellulosic material which then pass between pressure rolls. Preferably the vinyl film is extruded in molten condition since heat promotes to a high degree the effectiveness of the bonding of the plies as established by the anchoring material which is preferably carried in the cellulosic films.

Optionally, the vinyl film may be introduced between the water-insoluble hydrophilic cellulosic films in the form of a solution and the composite sheet then subjected to drying to remove the solvent. In this instance, either the resin lacquer or the cellulosic films may contain the anchoring agent. On the other hand, a self-supporting thermoplastic vinyl film may be placed between water-insoluble hydrophilic cellulosic films in the form of a prefabricated unstretched or oriented film. The assembled multiple-ply sheet is thereupon passed through one or more pairs of heated pressure rolls, or other device which exerts heat and pressure, to raise the temperature of the sheet and fuse the vinyl film, as well as to activate the anchoring agent (i.e. further condense the anchoring agent).

Before the composite sandwich-type wrapping material of the present invention can be assembled, it is necessary to incorporate an anchoring material in, or apply it to either the cellulosic films or the intermediate vinyl layer. The application of water-soluble anchoring materials is most conveniently accomplished by including such a material as an ingredient in the final liquid bath through which the cellulosic film passes before being dried. When the ingredient is a partially condensed thermosetting material, the drying is controlled so that some condensation may be delayed for continuance or completion during the laminating operation. As an alternative procedure, a light coating of organic solutions of the anchoring material comprising a volatile solvent may be sprayed on the dried cellulosic plies or an intermediate prefabricated vinyl film or spread thereonto by a doctor knife, or applied to the dry plies by dipping.

Thus it has been discovered that the cellulosic films may be adhered to opposite sides of a hydrophobic film or layer, such as one made of a vinyl resin, with sufficient permanency as to withstand thorough wetting without separation of the plies or laminae. It has been further discovered that the intermediate vinyl ply readily adjusts to swelling and shrinking of the composite sheet of this invention as a whole as caused by the outer cellulosic plies being wetted and dried. Because the intermediate ply must undergo deformation, the unoriented vinyl films which are susceptible of plastic deformation must be used.

When wetted on both sides, such a three-ply film or sheet stretches or shrinks in response to wetting and drying in a manner similar to that of a single ply uncoated cellophane sheet. By way of contrast, a two-ply sheet comprising a single ply of regenerated cellulose and a ply of vinyl film is unsatisfactory in this respect, because, when wetted, the two-ply sheet, or a casing made therefrom, tends to curl as the result of the substantially different swelling characteristics of respective plies, making it entirely impractical as a food wrapper of the type contemplated herein.

Recently discovered anchoring agents as disclosed by Cornwell Patent No. 2,639,241 include the polyalkylenimines and intermediate condensation products of thermosetting resins. These anchoring agents are merely exemplary of those that are known and may be used for the purposes of this invention. Thus any anchoring agents known in the art as being useful for adhering sarans or polyolefins to regenerated cellulose may be used herein. For example, the cellulosic films described herein may be treated with aqueous solutions or dispersions of water-soluble melamine-formaldehyde, urea-formaldehyde, ketone-formaldehyde, or phenol-formaldehyde resins, or mixtures of the several resin types. In general, solutions of such precondensates contain from 0.5 to 20 percent by weight of the precondensate. Such a solution is preferably applied while the cellulosic film is in the wet gel state. Plasticizers or other additives may be contained in the solution of the precondensate. The proportion of the anchoring resin and the cellulosic film may be varied somewhat, such as by varying the concentration of the resin in the bath through which the film is passed, but preferably the resin is present in the amount of about 0.5 to 2 percent by weight.

On the other hand, the polyalkylenimines described in U.S. Patent No. 2,999,782, issued September 12, 1961, may be used for anchoring the hydrophilic plies to the hydrophobic ply according to this invention. Although as indicated in that application, the polyethylenimines having a specific viscosity of over 0.15 are preferred, other polyalkylenimines having recurring ethylenimine units and having essentially the same molecular weight (specific viscosity being utilized as a measure of molecular weight) can be used, e.g. polypropylenimines, polybutylenimines, benzylethylenimines, etc.

The polyalkylenimines are preferably applied to the cellulosic films while in the wet gel state as an aqueous solution containing 0.1 to 1 percent of the polyimine. The polyalkylenimines may also be applied to one or both surfaces of dry cellulosic sheets as the dissolved ingredient in an organic solvent. For example, a cellulosic film may be satisfactorily prepared for laminating with vinyl layer by moistening the surface of the film with ethyl alcohol containing 0.25 percent of polyethylenimine having a degree of polymerization of slightly greater than 100. The alcohol solution may also be applied to the intermediate vinyl film without application to the cellulosic laminae.

The cellulosic sheets utilized according to this invention must be water-insoluble hydrophilic non-fibrous films which will stretch longitudinally and transversely when wet and shrink in both of these dimensions when dried subsequent to wet stretching thereof. Illustrative of the sheet materials which have been found useful in this invention is regenerated cellulose, whether prepared from viscose solutions, cuprammonium solutions, or solutions of cellulose ethers or esters such as nitrocellulose solutions, regenerated cellulose prepared from viscose solutions constituting a preferred embodiment. Alkali soluble, water-insoluble cellulose ethers are also useful in the present invention, e.g. hydroxyethyl cellulose, methyl or ethyl cellulose, carboxymethyl or carboxyethyl cellulose, the former constituting a preferred embodiment.

Moreover, mixtures of these forms and derivatives of cellulose are useful in the present invention. Thus viscose or cuprammonium solutions of cellulose and caustic soda or cuprammonium solutions of cellulose ethers or esters are mixed before or after aging of the viscose or cuprammonium solution of cellulose. For example, in one instance, a caustic soda solution of water-insoluble hydroxyethyl cellulose was injected into a viscose solution just prior to its being extruded. In another instance, a caustic soda solution of hydroxyethyl cellulose was mixed in the churn with viscose which had been aged about 5 hours, following which the mixture was aged further and processed in the manner conventional to the preparation of cellophane. In general, mixtures constituting from 8 to 100% by weight of a water-insoluble, alkali-soluble hydroxyethyl cellulose and from 92 to 0% by weight of regenerated cellulose are useful for the hydrophilic plies of this invention.

The vinyl sheet or layer which constitutes the interior lamina must be hydrophobic and susceptible of plastic deformation; illustrative vinyl polymers which are suitable for this invention are polyolefins and sarans. The sarans contemplated are those vinylidene chloride interpolymers having high impermeability to vapors generally and high vinylidene chloride/low intermonomer ratios. The commercially important binary or ternary interpolymers of high vinylidene chloride content are preferable because of their excellent resistance to moisture-vapor, oxygen, carbon dioxide and nitrogen transmission. These features of these interpolymers are said to result from strong intermolecular secondary valence forces which provide good resistance to polar as well as non-polar type vapors.

The vinyliedene chloride interpolymers useful for this invention possess a vinylidene chloride content of more than 50% and up to 95% by weight of the polymeric product. As a practical matter, it is genearlly necessary that the vinylidene chloride content be 75% by weight or more, and in the preferred embodiment, the vinylidene chloride content is between about 85% and 95% by weight. These interpolymers having the above described vinylidene chloride content may be interpolymerized with one, two or more other monomers, preferred polymeric products being copolymers or terpolymers of vinylidene chloride and one or more monomers from the group consisting of acrylonitrile, vinyl chloride, alkyl methacrylates wherein the alkyl chain contains 8 to 18 carbon atoms, alkyl acrylates in which the alkyl radical contains from 6 to 18 carbon atoms and mixtures of alkyl acrylates and methacrylates wherein the alkyl group of the acrylates contains from 1 to 8 carbon atoms and the alkyl group of the methacrylates contains from 8 to 18 carbon atoms.

Examples of the monomeric materials suitable for the preparation of sarans suitable for the purposes of this invention include the methyl, ethyl, isobutyl, butyl, hexyl, octyl, 2-ethyl-hexyl, decyl, n-dodecyl and n-octadecyl methacrylates and acrylates; phenyl, cyclo-hexyl and p-cyclo-hexyl phenyl methacrylates, methoxyethyl, chloroethyl and 2-nitro-2-methylpropyl methacrylates, and the corresponding esters of acrylic acid; methyl and octyl alpha-chloroacrylates; phenyl vinyl, methyl isopropenyl and methyl vinyl ketones; acrylonitrile, methacrylonitrile; vinyl esters such as the chloride, acetate, propionate, chloro-acetate, and bromide; isopropenyl acetate; styrene and vinyl naphthalene, ethyl vinyl ether; N-vinyl phthalimide, succinimide, and carbazole; acrylamide, methacrylamide and monoalkyl substitution products thereof; esters such as diethyl fumarate, maleate and itaconate, methylene diethyl malonate, dimethyl and dibutyl itaconate; dichloro-vinylidene fluoride; vinyl pyridine; maleic anhydride; allyl glycidyl ether and other unsaturated aliphatic ethers described in U.S. 2,160,943; and free acids such as itaconic, acrylic and methacrylic acids.

The coatings carried by the cellulosic base sheet of this invention may be applied by melt-extrusion, or from a lacquer or emulsion of the polymeric material. In the case of the polyolefin coatings, it is preferable to apply the coating by conventional melt extrusion procedures; see U.S. Patent No. 2,686,744. In the case of the vinylidene chloride interpolymers it is usually practicable to apply the coating from a lacquer or emulsion.

Among the solvents for the sarans which are presently considered satisfactory for forming coating compositions are methyl isobutyl ketone, methyl ethyl ketone, tetrahydrofuran, cyclohexanone, isophorone, dioxane, and mesityl oxide; a variety of organic diluents may be used with these solvents. Other ingredients having various functions are ordinarily mixed in the solution of the saran. For example to improve the feel and frictional properties of a saran surface which affect the satisfactory passage of a film through packaging machinery, a hydrophobic wax such as paraffin wax, carnauba, a hydrogenated vegetable or animal oil, a high molecular weight aliphatic ketone such as stearone, or a low molecular weight polyethylene may be mixed with the saran. The waxes, particularly paraffin or the hydrogenated oils, may also improve the impermeability of the saran to vapors. Materials for plasticizing the saran may be included in a solution thereof, such as dibutyl phthalate, ethyl diglycol phthalate, methyl phthalyl methyl glycolate, tricresyl phosphate, trioctyl phosphate, dibenzyl sebacate, and the various other phthalates, glycolates, phosphates and sebacates known to the plastic mixing art. The saran solution may also include in suspension materials which prevent the sticking of engaged saran-coated surfaces; such materials include fine particle clay, silica gel and talc and/or ester waxes.

The polyolefins used in this invention are of a variety of types, e.g. the resinous polyethylenes having molecular weights between 10,000 and 40,000 and density between 0.90 and 0.97 g./cc. Preferably the molecular weight is in the approximate range of 10,000 to 20,000 and the density in a range of about 0.91 to 0.95 g./cc. These latter ranges correspond to softening points in the range of 100° C. to 110° C. Polypropylene, on the other hand, having molecular weights of between about 10,000 and 100,000 are suitable for this invention. Preferably the polypropylene utilized according to this invention will possess molecular weights in the range of about 30,000 to 50,000, a density in the range of about 0.88 to 0.90 and a softening point in the range of about 100° to 125° C. The polyolefins, as normally used in this invention, are melt-extruded as films of polymer, or polymers, only, although they may be applied by known emulsion, solution, or powder technique and may be mixed with ingredients such as waxes, polyisobutylene and other compatible resins, dyes, pigments, and fillers, for special purposes.

In accordance with FIG. 1, supply rolls 5 and 6 are unwound and pass over guide rolls, such as rolls 7, 8, and 9, into the nip of a highly polished, metallic roll 10 and a roll 11 having a resilient surface provided, for example, by a peripheral layer of rubber or other vulcanizate. The roll 11 is preferably heated. A heated extruder 12 is positioned just above the nip of the rolls 10 and 11 for feeding a thin sheet of melted thermoplastic vinyl resin into the confluence of the running cellulosic films supported on the rolls 10 and 11. The roll 11 is adjustable in a direction toward or away from the surface of the roll 10 and is spring mounted whereby it may be adjusted to bear with any desired pressure upon the roll 10. To obtain sealing of the outer cellulosic sheets with the intermediate film of vinyl resin, the laminated sheet passes from the roll 10 over a chilled roll 14 to reduce the temperature of the sheet below the softening point of the resin. Thereafter the sheet passes around a guide roll 15 and through a humidifying tower 16 which moisturizes the cellulosic laminae to such an extent as to render the sheet sufficiently soft and pliable for packaging operations and use in commerce. On emerging from the humidifying tower the sheet is conducted over guide rolls 17 and 18 and wound into a product roll 20.

The procedure and apparatus shown in FIG. 1 are most generally used wherein the intermediate lamina is one of the polyolefins, such as polyethylene or polypropylene, although the same apparatus and procedure can be used when one of the above-described vinylidene chloride saran interpolymers is used instead of an ethylenically unsaturated polyolefin. On the other hand, the saran resin is generally applied as a solution in an organic solvent or as an equeous emulsion. Thus a multi-ply sheet is produced by introducing an organic solvent solution or aqueous emulsion of one of the saran or polyolefin resins of this invention as a layer between running lengths of the hydrophilic cellulosic sheets disclosed herein, following which the cellulosic sheets are joined with pressure and heat to each side of the layer and the organic solvent, or the water, is driven off by heating. Alternatively, a preformed sheet of a saran or a polyolefin can be introduced between wet gel cellulosic pellicles which have been impregnated with an anchoring agent, before the moisture content of the cellulosic pellicles drops below 30%. Thereafter the laminated structure is dried to obtain the finished product.

FIG. 1-A illustrates one embodiment of apparatus suitable for the solution or emulsion method of forming the multi-ply sheet of this invention. Moreover, it is a preferred embodiment of apparatus suitable for applying as an aqueous emulsion one of the saran resins disclosed herein. FIG. 1-A illustrates a portion of the drying apparatus conventionally utilized in the "double-spinning method" of preparing the cellulosic sheets disclosed herein. For a more detailed description of this apparatus and method in its entirety, see U.S. Patent No. 2,770,015.

In accordance with FIG. 1-A, a double web of water-insoluble hydrophilic cellulosic sheet material consisting of two wet gel pellicles 50 and 51 containing an anchoring agent described herein travels over and under heated drying rolls 52 and 53 respectively. The wet gel pellicles 50 and 51 may be dried additionally by directing heated air on them from ports 54 in conduits 55. After their moisture content has been reduced to about 30% by weight and before it is reduced below about 12% by weight, wet gel pellicles 50 and 51 are separated so that pellicle 50 travels from one drying roll 53 to adjacent drying roll 53 and pellicle 51 continues its normal path over drying roll 52 to adjacent drying roll 53 where wet gel pellicles 50 and 51 are again brought into face-to-face contact by drying roll 53 and pressure roll 57. At this point, an aqueous dispersion or organic solvent solution of a vinyl resin disclosed herein, preferably an aqueous emulsion of a saran resin, is deposited or sprayed through outlet 56 into nip 58 formed by rolls 53 and 57. The pressure supplied between rolls 53 and 57 and the heat supplied by the heating and drying apparatus consisting of parts 52, 53, 54, and 55 cures the anchoring resin, drives off the organic solvent and/or water, and forms the multi-ply sheet consisting of outer cellulosic layers 50 and 51 and hydrophobic vinyl resin layer 59. Upon completion of the drying, the multi-ply sheet is wound up on wind up roll 60.

Figure 2:
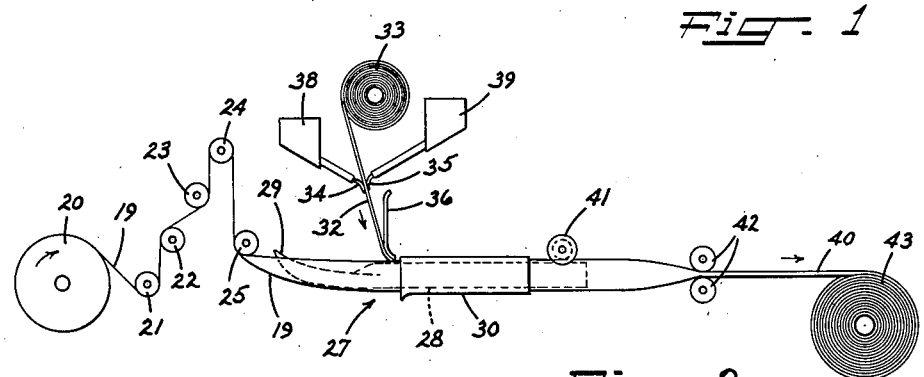
FIG. 2 is a diagrammatic longitudinal elevation of apparatus for forming the sheet material produced by the apparatus of FIG. 1 or FIG. 1-A into a tubular casing.
Figure 3:
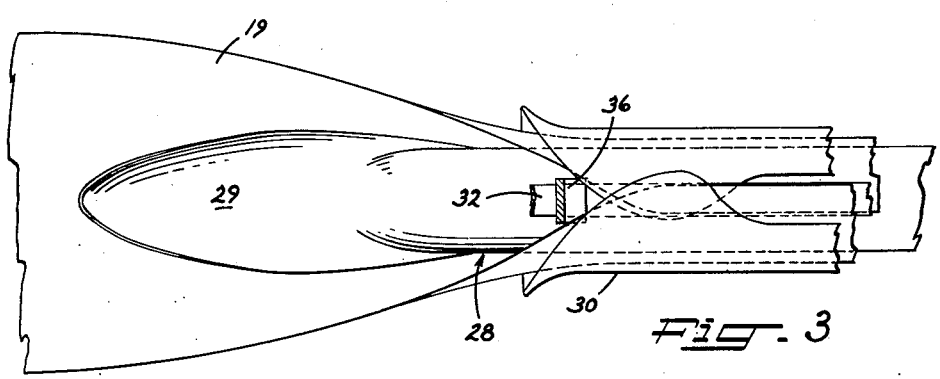
FIG. 3 is a fragmentary top view of a portion of the casing-forming apparatus of FIG. 2.

FIG. 2 and FIG. 3 illustrate a method and apparatus for the formation of a casing from the multi-ply sheet of this invention. The product roll 20 is unwound in the system of FIG. 2 as a sheet 19 which passes over a series of tensioning and guide rolls 21, 22, 23, 24, and 25 which place the sheet in a taut unwrinkled condition as it enters a forming device 27. This device comprises a tube-like mandrel 28 having a ski-tipped portion 29, and a shoe 30 which is coextensive with a substantial longitudinal portion of the mandrel 28. The shoe is held at lateral clearance with the coextensive portion of the mandrel whereby the sheet may be folded into a generally tubular shape and passed lengthwise between the shoe and the mandrel. The sheet 19 is initially distorted from a condition of transverse flatness into U-shaped cross section as it passes under the ski-tipped portion 29. It is further folded to bring its edges into overlapping relation as it passes into the shoe 30.

However, before the overlapping edges are brought into close juxtaposition, a strip 32 comprising preferably the resin which forms the intermediate lamina of the sheet is fed into a region between the overlapping edges of the sheet at the entrance end of the shoe 30. The strip 32 is unwound from a supply roll 33 and is drawn between a pair of brushes or wipers 34 and 35 which moisten both sides of the strip with the anchoring medium, and around a stationary guide 36. The wipers 34 and 35 are supplied with anchoring solution, such as alcoholic polyethylenimine, from tanks 38 and 39. The strip 32 is guided into position between the overlapping edges of the sheet 19 as it passes through the device 27. On emerging from the shoe 30, the overlapping edges of the sheet are pressed tightly together by a roller 41 which is preferably heated to a temperature to produce softening of the strip 32. Thus, the sheet is formed into a casing 40. The sheet 19 may be preheated before reaching the roller 41 by heating the shoe 30 and/or the mandrel 28, or by other obviously applicable heating means such as externally mounted infra-red or dielectric heaters. The casing 40, after leaving the discharge end of the device 27, is passed through a pair of nip rolls 42 driven at constant speed to provide a uniform rate of passage of the sheet through the device 27. The rolls 42 may be heated also to promote sealing of the seam of the casing. If this is done it is possible to dispense with the roll 41. The casing is flattened as discharged from the rolls 42 and is thereupon formed into a package such as the product roll 43.

Figure 4:
FIG. 4 is a fragmentary sectional view illustrating the seam of a casing produced by the apparatus of FIGS. 2 and 3.
Figure 1A:
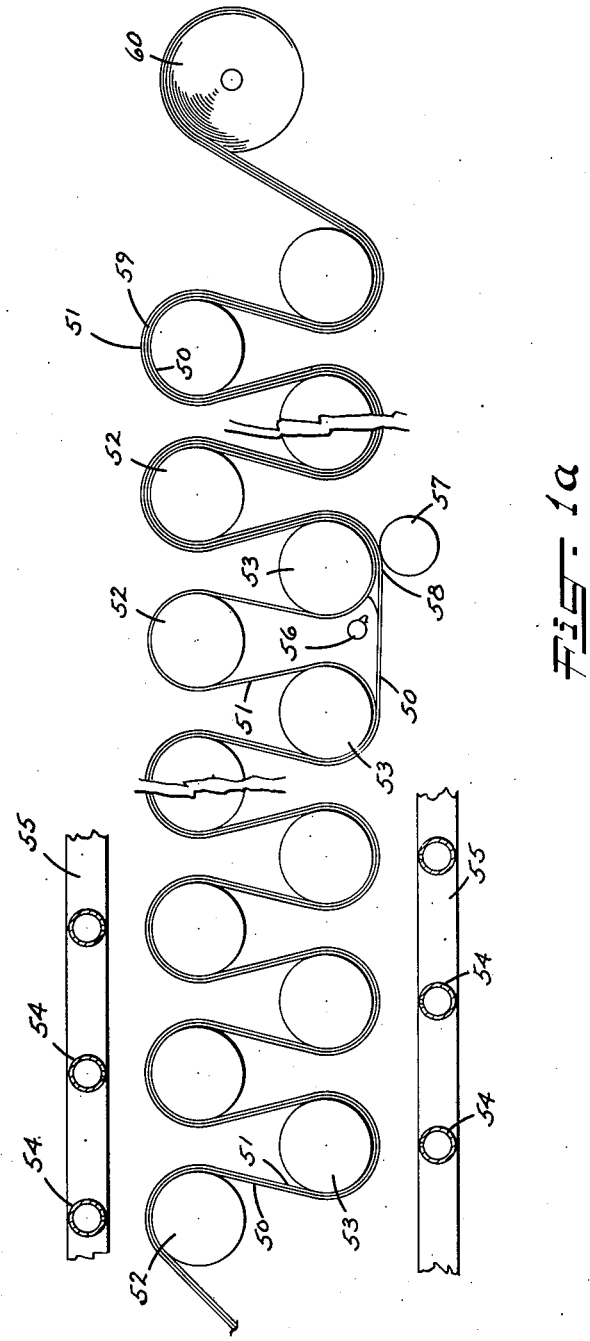

FIG. 4 illustrates a preferable form of the seam of the casing wherein the strip 32 is illustrated as being wider than the overlapping portions of the sheet 19. This type of construction assures that there will be no loose edges in the finished casing.

Several alternatives arise which are useful in this invention in place of the apparatus and method of FIG. 2 and FIG. 3. For example, if the casing is to be one which encases a substantially dry product, the casing formed according to FIG. 2 and FIG. 3 being suitable to encase a wet or dry product, it can be formed merely by applying heat and pressure to the overlapped margins of the sheet as taught by Kunz in U.S. Patent 2,607,696. Thus an anchoring resin as described herein, e.g. a polyalkylenimine or an amine-aldehyde resin is applied to the cellulosic sheet of this invention when it is in the wet gel state, or subsequent to its drying, e.g., regenerated cellulose, cellulose ether, or a mixture of these two cellulosic materials in the form of a sheet, and margins of the sheet are overlapped and joined to one another by subjecting the overlapped margins to heat and pressure.

On the other hand, if the casing is to be used in the presence of any significant amount of moisture, a casing can be formed from the composite sheet of this invention by applying alkaline medium to one or both of the margins thereof and pressing the treated margins together. This procedure is a well known one in the art; see, for example, Conti Patent No. 2,686,128 or Milne Patent No. 2,845,357. This latter method is the preferred method of preparation when the cellulosic sheet is composed of a cellulose ether film or a film formed from a mixture of a viscose solution of cellulose and an alkaline solution of cellulose ether, e.g. hydroxyethyl cellulose, as taught by Maxwell U. S. Patent No. 2,162,450 and Lillienfeld in U. S. Patent 2,176,085.

The invention is further illustrated by the following examples:

*Example 1*

A casing is constructed in accordance with this invention by feeding into an apparatus as shown in FIG. 1 two sheets of 300 grade (0.0009 to 0.001 inch thick) films of regenerated cellulose into the nip of the rolls 10 and 11 at about 80 feet per minute while feeding a layer of molten polyethylene approximately 0.003 inch thick into the vertex of the converging cellulose films. The rubber sheathed roll 11 is maintained at a temperature of about 105° C.; the roll 10, having a chrome plated surface, is maintained at a temperature of about 60° C. The regenerated cellulose films used had been treated during the manufacturing thereof prior to the above lamination step with a melamine-formaldehyde intermediate condensation type resin (Parez 607) while the films were in a gel condition to provide the anchoring agent for the polyethylene lamina in accordance with the Cornwell Patent No. 2,686,744.

The laminated sheet is then formed in the manner illustrated by FIG. 2 by incorporating between overlapping edges thereof a thin strip of polyethylene to form a seal as illustrated in FIG. 4. Prior to entering between the overlapping edges, the polyethylene strip is brushed on both sides with a 0.25 percent solution of polyethylenimine having a molecular weight of approximately 4500. The seal is bonded under pressure between surfaces maintained at 140° C. for 0.5 second.

*Example 2*

A three-ply casing is prepared by repeating Example 1 in its entirety except that polypropylene is substituted for both the polyethylene layer and the polyethylene strip thereof.

*Example 3*

A three-ply casing is constructed by the general procedure used in Example 1. The outer two sheets consist of raw uncoated films of 600 grade regenerated cellulose impregnated with polyethylenimine having a molecular weight of approximately 3200. The vinyl resin extruded from the device 12 is a saran polymer containing about 85% by weight of vinylidene-chloride and about 15% by weight of vinyl-chloride. The rate of extrusion and the rotation of the rolls 10 and 11 are correlated to produce a thickness of the resinous film deposited between the two cellulose films of approximately 0.5 mil. The rolls 10 and 11 are maintained at a temperature of 150° to 170° C. A polyethylene strip is treated with the polyethylenimine solution as disclosed in Example 1. The seal is bonded under the same conditions of temperature, pressure and time as are used in Example 1.

*Example 4*

The procedure of Example 3 is used in preparing a three-ply wrapping material consisting of two outer plies of 300 grade cellophane and an intermediate ply consisting of a melt-extruded saran polymer containing about 90% by weight of vinylidene chloride and about 10% by weight of acrylonitrile. The resulting laminate was readily stretchable after being soaked in water and the wet casing, when stuffed with meat, shrunk tightly around the contents as it dried into moisture equilibrium with the atmosphere.

*Example 5*

A three-ply casing is prepared by feeding into the apparatus of FIG. 1–A two superimposed sheets of wet gel regenerated cellulose (300 grade) containing a melamine-formaldehyde precondensate (see Cornwell Patent 2,686,-744). An aqueous emulsion of a polymer consisting of about 90% by weight of vinylidene chloride and about 10% by weight of acrylonitrile is sprayed by sprayer 56 on the inner surfaces of the separated moving cellulosic sheets approximately at the point where they are rejoined, nip 58. This laminate is pressed together by rolls 53 and 57, dried and cured by the drying means consisting of parts 52, 53, 54 and 55. A casing is formed from this laminate in the same manner as in Examples 1–4 except that a strip of saran polymer containing about 90% by weight vinylidene chloride and about 10% by weight acrylonitrile is utilized to seal the margins of the laminate when overlapped in the apparatus of FIGS. 2 and 3.

*Example 6*

A three-ply casing is prepared by repeating Example 5 in its entirety except that a saran polymer latex containing about 90% by weight of vinylidene chloride, about 4% by weight of methacrylic acid, and about 6% by weight of methyl methacrylate is substituted for the saran latex of Example 5.

*Example 7*

A casing is constructed in the apparatus of FIG. 1 by feeding two sheets of alkali-soluble water-insoluble hydroxyethyl cellulose which had been, before final drying, impregnated with 0.2 percent solution of polyethylenimine, having a molecular weight of approximately 3200, and combining the sheets with an intermediate layer of molten polyethylene approximately 0.003 inch thick. Substantially the same conditions of operation are used as described in Example 1. The resulting laminated sheet is then formed in the apparatus of FIG. 2 without the use of a resinous sealing strip constituting the roll 33. Instead, opposed surfaces of the overlapping edges of the sheet are moistened with caustic to render the opposing surfaces tacky as they pass under the roll 41. The edges of the sheet are joined to form a casing. The resulting casing is readily stretchable when the outer and inner hydroxyethyl cellulose ether laminae are moistened in an aqueous medium. The moistened casing was found to shrink in a manner similar to that of the casing formed according to Example 1.

*Example 8*

Viscose comprising by weight 8.7% cellulose and 5.6% caustic soda which has been aged about 3½ hours is transferred from the churn through a conduit to the churn mixer. Water-insoluble alkali-soluble hydroxyethyl cellulose dissolved in caustic soda to give a solution comprising in percent by weight 7.5% caustic soda and 7.5% hydroxyethyl cellulose is metered into the conduit to mix with the viscose as it is transported to the churn mixer. After all of the hydroxyethyl cellulose has been introduced into the conduit and transported to the churn mixer, the mixture containing, in percent by weight on the cellulose content, about 80% cellulose and about 20% hydroxyethyl cellulose is mixed in the churn mixer for about 4 hours. From the churn mixer this mixture goes to an aging cellar where the mixture is aged for an additional period of time of about 20 hours. Following which in accordance with usual procedures for extruding viscose, the mixture of viscose and hydroxyethyl cellulose is extruded in the form of a film into an acidic coagulating bath containing about 22 to 24% by weight of ammonium sulfate, about 12% by weight of disodium sulfate, and about 3 to 4% by weight of sulfuric acid. After coagulation the wet gel film is subjected to the usual wet processing procedures conventional to cellophane manufacture, including passing the wet gel sheet through a bath containing a glycerine plasticizer and a melamine formaldehyde resin anchoring agent, following which the sheet is dried in the usual manner. The thus prepared film containing a uniform mixture of about 80% by weight cellulose and about 20% by weight of hydroxyethyl cellulose is made into the form of a composite sheet by extruding polyethylene between two cellulosic sheets of this nature in the same manner as in Example 1.

*Example 9*

A viscose of the same composition as in Example 8 having an age of about 42 to 44 hours is mixed in a mixing chamber with a hydroxyethyl cellulose solution of the same composition as Example 8 in a proportion of 4 parts of viscose to 1 part of hydroxyethyl cellulose. Following the mixing thereof, the mixture is extruded into a coagulating bath consisting essentially of about 13% by weight sulfuric acid and about 20% by weight of disodium sulfate. Following which it is processed in the same manner as described in Example 8 and a composite sheet is formed of two such cellulosic sheets by extruding polypropylene between them in the manner described in Example 2.

*Example 10*

The procedure of Example 9 is repeated in its entirety except that polyethylene is substituted for the polypropylene thereof.

*Example 11*

The procedure of Example 8 is repeated; however, prior to coagulation the mixture of the viscose cellulose solution and hydroxyethyl cellulose solution is impregnated in, and coated on, a tissue paper reinforcement as disclosed in U.S. Patent No. 2,993,812, issued July 25, 1961.

The wrappers and casing which may be produced in accordance with this invention are capable of stretching when the cellulose laminae are wet and shrinking in reaching a substantially dry condition in substantially the same manner as a raw uncoated regenerated cellulose film. Such shrinking occurs when the casings are packed with moist material. In this instance, it appears that the outer cellulose lamina is primarily responsible for shrinking since the inner cellulose lamina remains damper than the outer lamina. Such behavior particularly adapts the laminated product described herein for the packaging of tightly wrapped food products with the further advantage of being impervious to the passage of moisture and other vapors through the wrapper whereby odorless packaged products are provided. The wrapping material described herein requires no coating for most purposes, although one may be added to one or both surfaces to render it more useful under those conditions in which stretching and shrinking from absorption and loss of moisture is not essential. This new wrapping material has outer surfaces of non-fibrous regenerated cellulose, a cellulose ether or mixtures of the same described in U.S. Patent No. 2,993,-812, and thus has high luster and outstanding abrasion resistance. When used for food packaging, the inner cellulose layer protects the final layer from permeation by greases which normally cause some deterioration of some of the vinyl films. In the packaging of food products having transparent wrappers of which all portions of the inner surfaces thereof cannot fit tightly against the foodstuff packed therein because of irregularities and cavities of, e.g., hams and whole fowl, a wrapper having a hydrophilic inner surface such as the material described herein is advantageous in the respect that there is a lack of formation of drops or fine droplet condensation which tends to obscure the sight of the contents of the package and render the appearance of the package as a whole less attractive.

The wrapper of this invention is advantageous in a further respect in that printing may be placed internally of the laminate for protection from abrasion and fading, made visually brighter and sharper, and prevented from contaminating of the food enclosed by the wrapper. Inks which are ordinarily considered food contaminating may be used, if desired. Sheets and casings of the laminate herein described may be produced and stored in large packages and delivered as such to the food manufacturer or other user of these materials. The casings or sheets are found to be particularly free of "blocking," i.e., free from the tendency of the outer surfaces of adjacent windings to stick together because the outer cellulosic laminae are uncoated. In view of the tendency prevailing in modern retail food outlets to pre-package all types of perishable foods in sealed wrappers, the materials provided by the present invention are unusually advantageous in that they provide a shrinkable wrapper which may be used in place of unlaminated cellulose wrappers for the purpose of eliminating the normal loss of weight that occurs between the time of packaging and the time of sale. This is true particularly with respect to those food products which must be maintained in a freezing dehydrating atmosphere.

While preferred embodiments of the invention have been shown and described, it is to be understood that changes and variations may be made without departing from the spirit and scope of the invention as defined in the appended claims.

I claim:

1. A flexible moistureproofed food wrapping material comprising two exterior water-insoluble hydrophilic cellulosic plies, an intermediate ply comprising a hydrophobic material susceptible of plastic deformation selected from the group consisting of polyolefins having molecular weights of from 10,000 to 100,000 and densities in g./cc. of from 0.88 to 0.97 and interpolymers containing 50–95% by weight of vinylidene chloride and a resin-type anchoring material uniformly distributed throughout the interfaces of said intermediate ply with each exterior ply and constituting a moistureproof bond firmly uniting said plies, said moistureproofed wrapping material stretching longitudinally and transversely when wet and shrinking longitudinally and transversely when dried subsequent to wetting.

2. The flexible moistureproofed wrapping material of claim 1 having a coating on at least one side thereof comprising a hydrophobic material selected from the group consisting of polyolefins having molecular weights of from 10,000 to 100,000 and densities in g./cc. of from 0.88 to 0.97, and interpolymers containing 50 to 95% vinylidene chloride.

3. The flexible moistureproofed wrapping material of claim 1 wherein said cellulosic plies are ones selected from the group consisting of regenerated cellulose plies, alkali-soluble water-insoluble cellulose ether plies and mixtures of the same.

4. The flexible wrapping material of claim 3 wherein said intermediate ply is a polyolefin selected from the group consisting of polyethylene and polypropylene.

5. The flexible wrapping material of claim 4 having a coating on at least one side thereof comprising an interpolymer of from 50 to 95% by weight of vinylidene chloride.

6. The flexible wrapping material of claim 3 wherein said intermediate ply is an interpolymer containing 50 to 95% by weight of vinylidene chloride.

7. The flexible wrapping material of claim 3 wherein said hydrophilic plies are constituted of regenerated cellulose.

8. The flexible wrapping material of claim 3 wherein said hydrophilic plies are constituted of 8 to 100% by weight of a water-insoluble alkali-soluble hydroxyethyl cellulose and 92 to 0% by weight of regenerated cellulose.

9. A thin-walled food casing comprising two water-insoluble hydrophilic cellulosic plies, and an intermediate ply between said two hydrophilic plies comprising a substantially moisture impervious hydrophobic material susceptible of plastic deformation selected from the group consisting of polyolefins having molecular weights of from 10,000 to 100,000 and densities in g./cc. of from 0.88 to 0.97 and interpolymers containing 50 to 95% by weight of vinylidene chloride, and a resin-type anchoring material uniformly distributed throughout the interfaces of the intermediate ply with each of the hydrophilic plies and constituting a moistureproofing bond firmly uniting said three plies, said moistureproofed casing material stretching longitudinally and transversely when wet and shrinking longitudinally and transversely when dried subsequent to wetting, marginal portions of said cellulosic plies being overlapped and secured to one another by a bonding material.

10. The thin-wall casing of claim 9 wherein said bonding material consists essentially of a strip of said hydrophobic material.

11. The thin-wall casing of claim 9 wherein both said intermediate ply and said bonding material are selected from the group consisting of polyethylene and polypropylene.

12. The thin-wall casing of claim 9 wherein both said intermediate ply and said bonding material consist essentially of an interpolymer containing 50 to 95% by weight of vinylidene chloride.

13. The thin-wall casing of claim 9 wherein said hydrophilic plies are constituted of 8 to 100% by weight of a water-insoluble alkali-soluble hydroxyethyl cellulose and 92 to 0% by weight of regenerated cellulose, and said bonding material is an alkaline medium.

References Cited in the file of this patent

UNITED STATES PATENTS

| | | |
|---|---|---|
| 1,266,766 | Brandenberger | May 21, 1918 |
| 2,273,677 | Wallach | Feb. 17, 1942 |
| 2,504,417 | Hofrichter | Apr. 18, 1950 |
| 2,686,725 | Cornwell | Aug. 17, 1954 |
| 2,686,726 | Grantham | Aug. 17, 1954 |
| 2,686,744 | Cornwell | Aug. 17, 1954 |
| 2,845,357 | Milne | July 29, 1958 |